United States Patent [19]

Dejob et al.

[11] 4,298,963

[45] Nov. 3, 1981

[54] JETTISONING AND FLOTATION DEVICE FOR A SUSPENDED LOAD, PARTICULARLY AN UNDERWATER LISTENING BODY

[75] Inventors: Roger M. Dejob, Verrieres-le-Buisson; Marcel P. Tardivon, Fontenay aux Roses, both of France

[73] Assignee: Etat Francais represente par le Delegue Ministeriel pour l'Armement, Paris-Armees, France

[21] Appl. No.: 635,680

[22] Filed: Nov. 28, 1975

[30] Foreign Application Priority Data

Nov. 28, 1974 [FR] France .............................. 74 38948
Sep. 11, 1975 [FR] France .............................. 75 27818

[51] Int. Cl.³ .............................................. H04B 1/59
[52] U.S. Cl. ................................... 367/4; 244/138 R
[58] Field of Search ....................... 340/2; 244/138 R; 367/3, 4, 5

[56] References Cited

U.S. PATENT DOCUMENTS 3,328,750  6/1967  Gimber et al. ......................... 367/3
3,889,224  6/1975  Reed et al. ............................. 367/3

*Primary Examiner*—Richard A. Farley
*Attorney, Agent, or Firm*—William R. Hinds

[57] ABSTRACT

Apparatus or a device for use in the jettisoning and flotation of a suspended load, particularly an underwater listening buoy, comprises a parachute for suspending the load during descent between jettisoning and flotation, and at least one inflatable float for maintaining the load at a predetermined depth in a body of water. The float comprises a pillow-shaped inflatable ballonet fixed in the central portion of the parachute. It may have an inflation sleeve coupled at one end to the ballonet for inflating the ballonet with the superatmospheric pressure generated by the descent of the parachute. A tension member may be provided fixed at one end to the free end of the sleeve and at its other end to the load so as to extend the sleeve downwardly during descent. The inflation sleeve preferably is of frustoconical form and divergent toward its lower free end. A releasable fastening device is provided such that the load is released from its normal sling connection when the apparatus enters the water, and is thereafter supported at a predetermined depth by a member coupling it with the float ballonet. In one embodiment the releasable fastening device comprises part of the cover of a container comprising the load, and in another embodiment the releasable fastening device is a rocking fastener connected between the inflation sleeve and the load. A whip antenna is carried by the ballonet.

14 Claims, 8 Drawing Figures

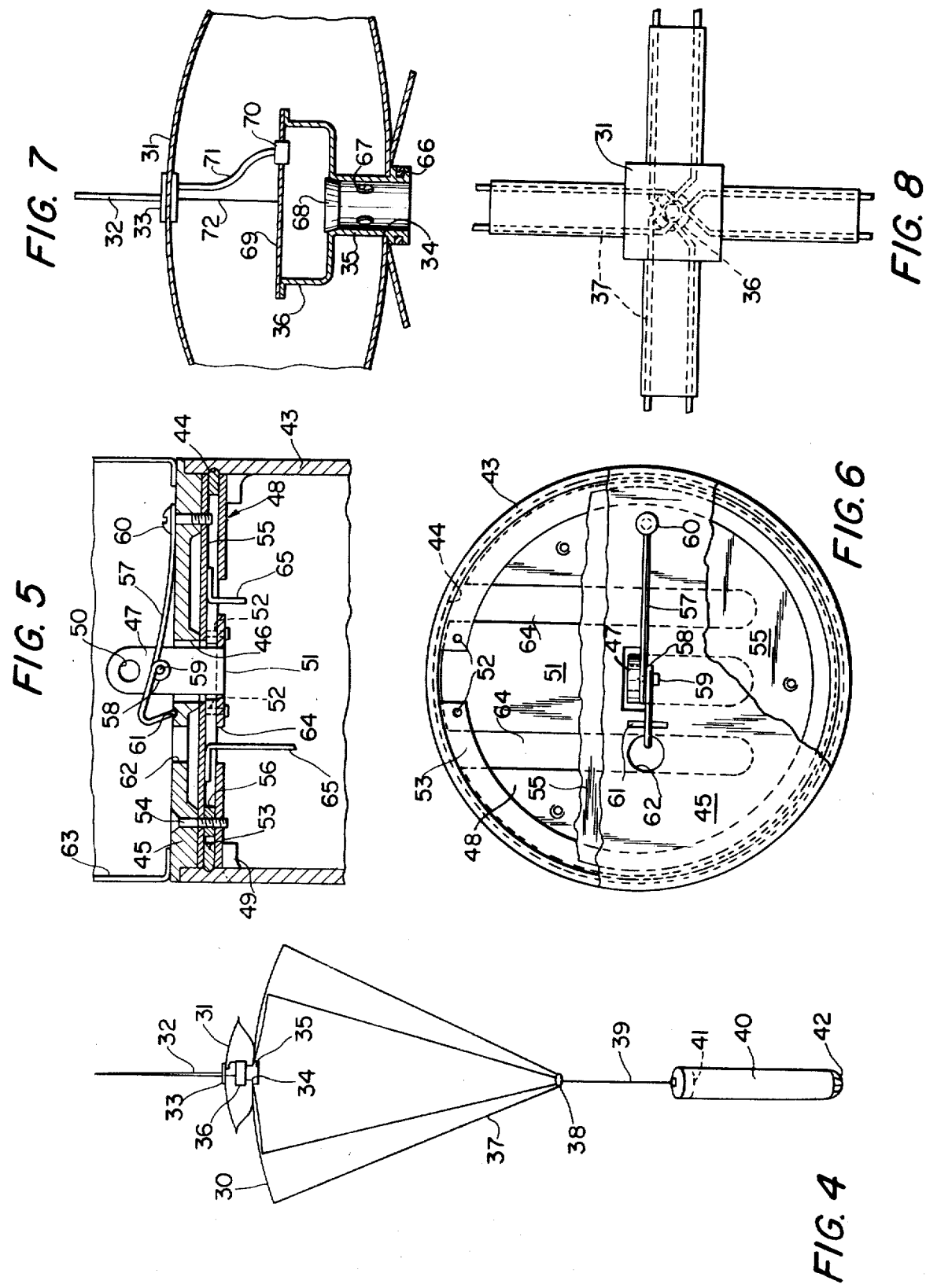

JETTISONING AND FLOTATION DEVICE FOR A SUSPENDED LOAD, PARTICULARLY AN UNDERWATER LISTENING BODY

FIELD OF THE INVENTION

The present invention concerns devices or apparatus for use in jettisoning and floating suspended bodies, such as underwater listening buoys intended to be used in calm or rough waters.

BACKGROUND AND SUMMARY

Before being jettisoned or thrown into the sea, for example from airplanes or helicopters, such underwater listening buoys form compact units comprising radio equipment, disposed in watertight bodies, and electro-acoustic equipment. On contact with the water, the electro-acoustic equipment becomes detached from the radio equipment, while remaining connected thereto by a suspension link which is both electrical and mechanical, and descends into the water to a predetermined depth. This link consists conventionally of a coiled cable. The radio equipment is mechanically and electrically connected to an antenna which radiates Hertzian waves toward an aircraft in which they are received and processed.

The essential requirement involved in jettisoning a unit of the aforesaid type is that the unit must not be damaged when it comes into contact with the water. For use in jettisoning units of this type, there have hitherto been employed either rotochutes of the autogyro type, or parachutes, typically of cruciform type. Known jettisoning devices of the type comprising a cruciform parachute sometimes comprise an inflatable float associated with the parachute, there being contained in the float a radiating wire which is tensioned when the float is inflated, and which performs the function of an antenna. Such a device is relatively simple, involves little cost in regard to the antenna, is of small overall dimensions when folded, and ensures good insulation against sea water. However, it has disadvantages. The float forms a relatively considerable or large wind catch, so that the buoy is caused to drift, and this results in errors in location. This considerable wind catch also brings about a considerable inclination of the antenna, which is unfavorable to the radiation of the antenna, and can result in induced noise on the cable carrying the electro-acoustic equipment, whereby the sensitivity of the latter is reduced. Although it is economical in regard to the antenna, such prior devices are costly because they necessitate the use of a considerable quantity of waterproof fabric, and usually can only be produced by specialized labor. In addition, the known inflatable floats are generally inflated by active inflating devices such as compressed air bottles, which accordingly increases the cost of production. Such floats generally consist of a sphere on which there is mounted a cone, so that they are difficult to produce. If they are of tetrahedral form, they frequently have insufficient reserve of buoyancy if the foot of the antenna is positioned below the level of the sea.

The basic object of the present invention is to obviate the aforesaid disadvantages and to provide a generally improved jettisoning and flotation device, particularly for acoustic buoys, which device, while being of low cost, has a relatively small wind catch.

Generally the invention comprises a jettisoning and flotation device for a suspended load, particularly an underwater listening buoy, comprising a parachute from which the load is suspended, and at least one inflatable float intended to maintain the load at a predetermined depth, characterized in that the float consists of a pillow-shaped ballonet fixed in the central part of the parachute and extended by an inflation sleeve acting under the effect of the superatmospheric air pressure generated by the parachute in its descent, the sleeve being stretched by a tension member whose ends are fixed to the free end of the sleeve and to the load, respectively. Such a pillow-shaped ballonet, being generally of relatively small vertical dimension relative to its lateral dimensions, is substantially less affected by wind than are the known devices of the previously described types.

The invention also comprises improved arrangements for suspending the load from a parachute during descent and releasing the load upon entry into the water, to be suspended at a predetermined depth below the float, being connected to the float electrically and mechanically. Thus, the invention also comprises a jettisoning and flotation device for a suspended load, including a parachute from which the load is suspended, and an inflatable float intended to maintain the load at a predetermined depth after entry into the water, the load being fixed to the parachute by means of a sling fixed at one end to the parachute suspension lines and linked to the load at the other end through a releasable fastening arrangement which is constructed to release the load after entry into the water such that the load can be suspended at a predetermined depth below the float, being coupled to the float. In one embodiment, the releasable fastening device releases the connection between the load and the suspension lines of the parachute, and suspends the load beneath the float by an electrical conductor and a resilient link. The release of the load is governed in part by a link coupled to the releasable fastener and the lower end of the inflation sleeve. In another embodiment, the load is in the form of a tubular envelope, and the releasable fastening device is formed in the cover or lid for the envelope, the parachute sling being coupled to this cover, and the cover being releasable upon entry of the envelope into the water, such that the envelope is free to descend further to a predetermined depth governed by a cable coupling the load to the float carried by the parachute.

Other and further objects, features and advantages of the invention will become apparent to those skilled in the art from the ensuing description of preferred embodiments, taken in conjunction with the accompanying drawings.

DESCRIPTION OF THE DRAWINGS

FIG. 4 is a diagrammatic perspective view, partially sectioned, of a further embodiment.

FIG. 5 is a sectional elevation view of the releasable fastening device for the load in accordance with the embodiment of FIG. 4.

FIG. 6 is a plan view of the device of FIG. 5.

FIG. 7 is a sectional elevation view of the float ballonet portion of the device of FIG. 4, showing the housing of the transmitter in the ballonet.

FIG. 8 is a plan view of an exemplary parachute construction in accordance with the embodiment of FIG. 4.

DESCRIPTION OF A PREFERRED EMBODIMENT

Figure 1:
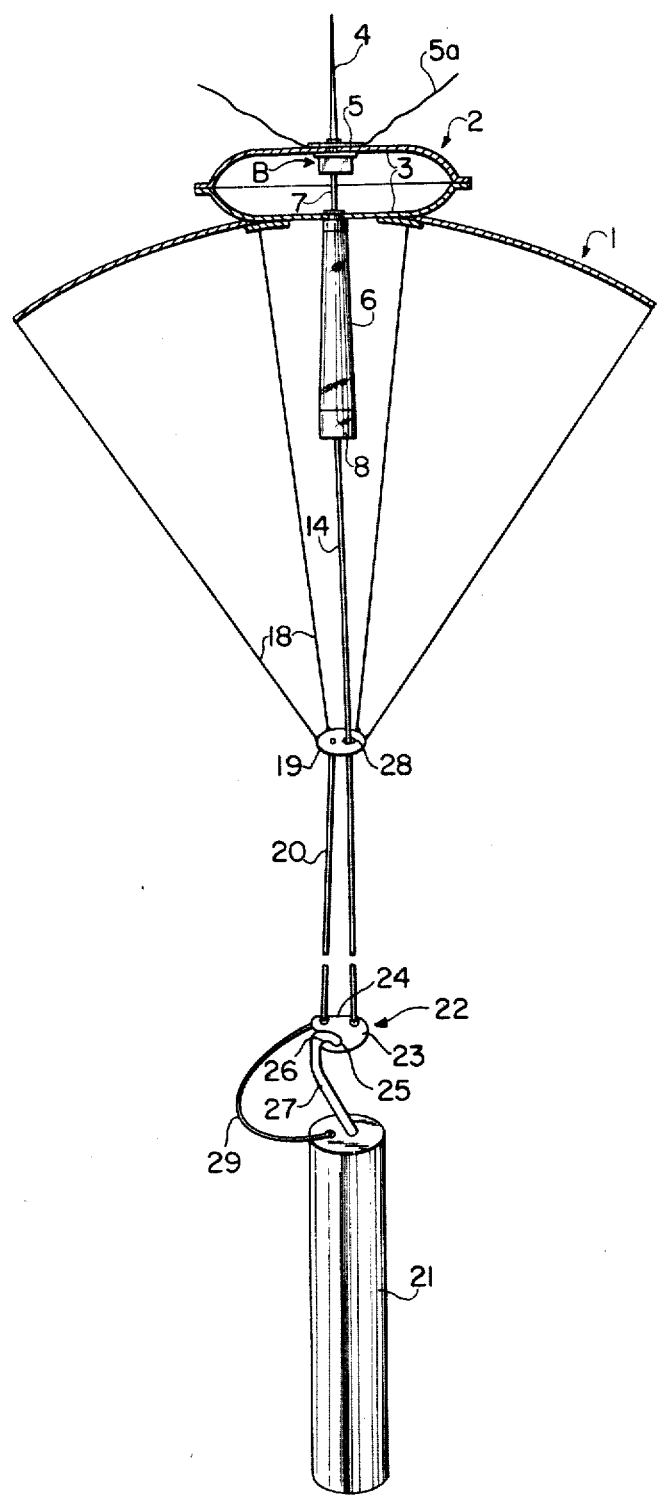
FIG. 1 is a sectional elevation view of a jettisoning device in accordance with a preferred embodiment of the invention.

The jettisoning device or apparatus illustrated in FIG. 1 comprises mainly a cruciform parachute 1 (see FIG. 3) which supports in its central region, a pillow-shaped flotation ballonet 2 consisting of two squares 3 of waterproof fabric secured edge-to-edge.

Secured to the center of the upper square 3 is a whip antenna 4. For this purpose, there is adhesively or otherwise secured to the square of fabric intended to support the antenna a rigid disk 5, which is formed with a central orifice through which there extends the lower end of the antenna 4. The antenna is fixed in the disk, for example, by screwing. Three metal braids 5a, forming a radio ground plane, are also fixed to the disk 5. This disk also constitutes the lid or a box B containing the radio transmission equipment.

The lower square 3 is formed with an orifice in its central part, to which there is connected a sleeve 6 of frustoconical form, the center of the end of the sleeve connected to the lower square 3 being joined to the box B of the transmission equipment by means of an elastic element 7, the elastic element functioning to limit the height of the ballonet when inflated, and generally to maintain the pillow-shaped configuration of the ballonet.

The sleeve 6 is preferably made of waterproof fabric, and its mean diameter is several centimeters, while its length is between about 20 centimeters and 1 meter, depending upon the value of the superatmospheric pressure which must exist in the ballonet 2 in order to maintain its form.

Figure 2:
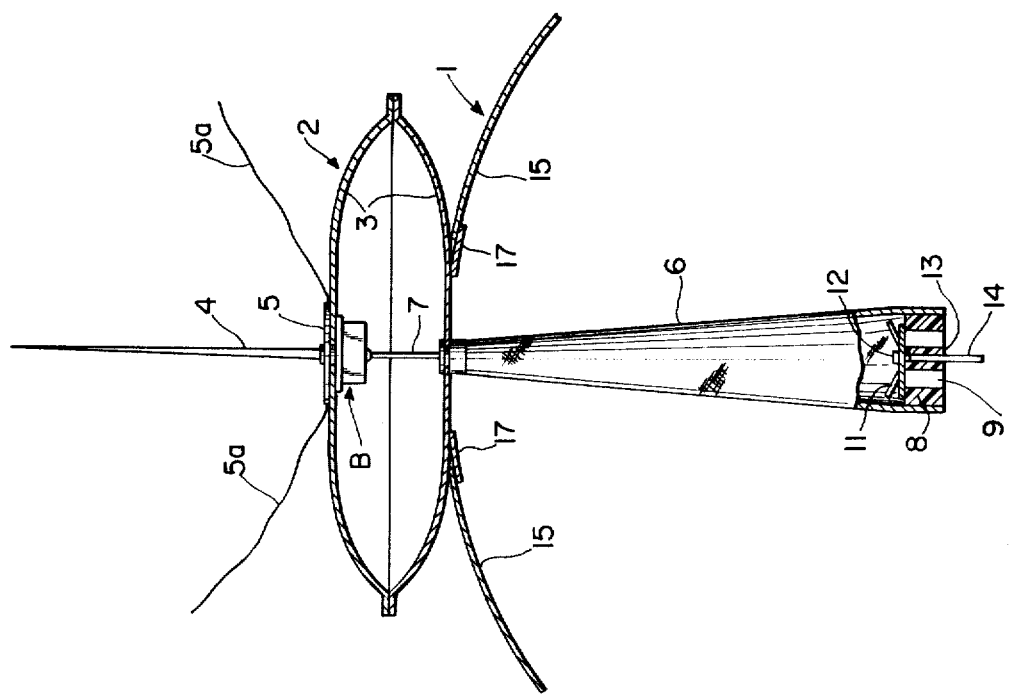
FIG. 2 is a more detailed fragmentary view of the device of FIG. 1.

As may be seen from FIG. 2, the sleeve comprises at its lower end, which is the end opposite the ballonet 2, a valve 8 consisting of a hollow cylindrical element of plastic material, which is provided with an internal spider 9 and a seat for a valve member 11 consisting of flexible fabric fixed to the center of the spider 9 by means of a rivet 12 which engages in an axial passage 13 in the spider. Although a valve member has been provided in the present embodiment, it is not essential.

Secured in the passage 13 is the upper end of a member for tensioning the sleeve 6, consisting of a link 14.

Figure 3:
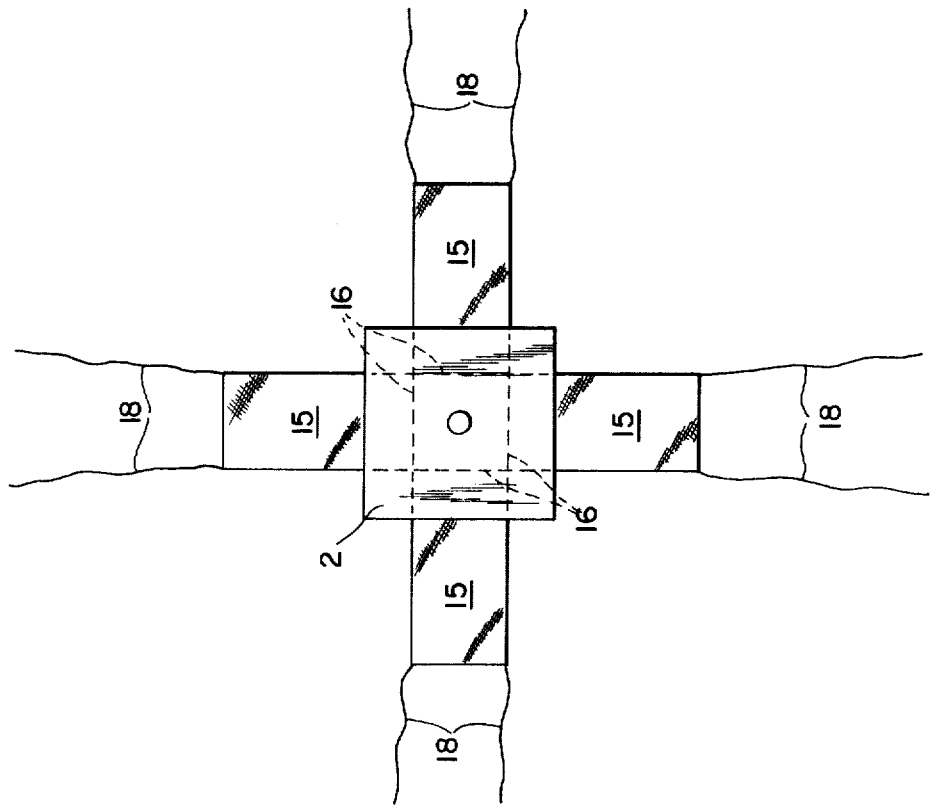
FIG. 3 is an overhead view of a device in accordance with FIGS. 1 and 2.

As is shown in FIG. 3, the cruciform parachute 1 is formed of four rectangles 15 of fabric or plastic sheet, which are sewn or adhesively secured, each at one of its small sides, to the lower square 3 of the ballonet 2. The seams of adhesive bonds 16 are protected by waterproof strips 17 which ensure fluid-tightness of the ballonet, and reinforce the parachute. The strips 17 are adhesively secured to the seams or adhesive bonds 16.

Secured to the sides of the rectangles 15 are suspension lines 18, the suspension lines being connected in a known manner to a central member 19, to which there is attached the upper end of a sling 20, the lower end of which supports a load 21 which is to be jettisoned and then floated by means of apparatus according to the invention.

The rectangles 15 may be optionally apertured to form in combination a funnel for the stabilization of the parachute.

In the present example, the load 21 consists of electro-acoustic equipment connected to the antenna 4 by a conductor (not shown). The load 21 is secured to the sling 20 by means of a coupling device 22 comprising a rocking fastener. The rocking fastener comprises two plates 23 having a rectilinear side 24 and a lateral recess 25 in which there is engaged a hook 26 which is fast with a rod 27 for the suspension of the load 21. The sling 20 is secured to that end of the rectilinear side 24 of the plates 23 which is closer to the recess 25. At their opposite end, the rectilinear sides 24 of the plates 23 lock the link 14, which extends through the member 19 by way of an orifice 28. The coupling device 22 is connected to the load 21 by a resilient link 29, such as an extensible spring of a length of about 2.50 m.

In operation of the device, in the position before jettisoning, the sling 20 preferably is folded into two equal halves, which are sewn together by a snappable filament (not shown). In another arrangement, a shock absorber may be inserted between the sling 20 and the coupling device 22.

When the parachute opens out, the sling 20 is more tightly tensioned than the link 14. The filament by which the two halves of the sling are held together snaps, so that the sling alone performs the suspension of the load 21 during the descent of the parachute. The link 14 maintains the sleeve 6 in a position such that the increase of the air pressure, due to the descent, causes air to penetrate into the sleeve, with the result that the ballonet 2 is inflated.

When the load 21 enters the water, the tension of the sling 20 is relaxed, and the link 14 causes the fastener 22 to rock and hence to release the hook 26, so that the load is then connected to the remainder of the device only by the resilient link 29 and by the electric connecting cable (not shown).

The superatmospheric pressure in the ballonet 2 is considerably increased by the admission of water into the lower part of the sleeve. The valve member is then applied against its seat 10, and prevents any escape of water, and thus confines the air contained in the ballonet.

The elastic element 7 exerts on the opposite walls of the ballonet 2 a resilient force in opposition to the pressure of the air penetrating into the ballonet through the sleeve 6, and thus combines with the valve 8 to ensure maintenance of the antenna.

Referring now to the embodiment of FIGS. 4-8, the jettisoning and flotation apparatus of this embodiment comprises a cruciform parachute 30 (see FIGS. 4 and 8) which supports in its central region a pillow-shaped flotation ballonet 31. Secured to the center of ballonet 31 on its upper wall is a whip antenna 32 supported by the ballonet fabric through a rigid disk 33 glued to the fabric. The lower side of ballonet 31 is formed with an orifice 34 in which is fixed a tubular part 35 of a box 36 located in the interior of the ballonet, for containing the transmitter associated with the antenna. The structure and attachment of box 36 will be described subsequently in detail in connection with FIG. 7.

Parachute 30 has suspension lines 37 linked to a central member 38, to which is coupled the upper end of sling 39, the lower end of which carries load 40, as shown in FIG. 4. This load consists of, for instance, electro-acoustic equipment connected to the antenna 32 by a conductor (not shown). The load 40 is secured to sling 39 by means of a coupling device indicated generally at 41 in FIG. 4, this coupling device comprising a releasable fastener which will be described in detail in connection with FIGS. 5 and 6.

Load 40 is in the form of a tubular envelope, having a streamlined ballast end 42 for facilitating entry into the water, thus permitting faster descents without substantial risk for the equipment carried by the envelope 40.

The releasable fastener 41 shown in FIGS. 5 and 6 is located in the upper end 43 of tubular envelope 40. The releasable fastener itself includes an inner peripheral groove 44 formed in the inner wall of the envelope, and a cover 45 formed with a central orifice 46 through which a connector 47 passes for engagement with a split disk 48 supported in the interior of envelope 43 beneath the groove 44, being supported there by protrusions 49 extending inwardly from the envelope wall. Connector 47 is provided with an aperture 50 by which it is connected with the lower end of sling 39.

Connector 47 is coupled to a flexible central region or tongue 51 (see FIG. 6) of split disk 48. This central region or tongue 51 preferably is bent slightly downwardly where it joins with the body proper of disk 48, and is provided at its free end with upwardly directed stop members 52, as shown most clearly in FIG. 5, which bear against suitable formations in the opposed end portions of a resilient retaining split ring 53 so as normally to maintain a separation between the ends of the split ring 53, and hence hold the body of the split ring 53 in the groove 44 in opposition to the spring tendency of ring 53 to spring inwardly to a reduced diameter configuration, and thus move out of groove 44. Protrusions 49 are spaced about the interior of envelope 43 so as not to interfere with the ability of tongue 51 to move downwardly. Split disk 48 is fixed to cover 45 by screws 54, which also secure an intermediate disk 55 disposed between cover 45 and split disk 48. Intermediate disk 55 is spaced from split disk 48 by spacer washers 56, which are of greater thickness than split ring 53 so as to ensure free radial movement of split ring 53 between disks 48 and 55.

On the upper surface of cover 45 a spring 57 is secured at one of its ends by a screw 60, and spring 57 is provided with a loop engaged on a finger 59 carried by connector 47. The other end of spring 57, opposite to the end which is secured by screw 60, is bent downwardly and engaged in a groove 61 formed in cover 45. Cover 45 is formed with an opening 62 for receiving this end of spring 57 after its curved end is freed from groove 61, such that the elastic force of the spring is free to act on connector 47.

A parachute container 63 may be secured to the upper face of cover 45.

There is a clearance between the lateral surface of cover 45 and the inner wall of envelope 43 in order to provide ready separation between the two when the cover is released by elastic split ring 53 upon entering the water.

As best seen in FIG. 6, central region or tongue 51 of split disk 48 is bordered by slots 64, which extend downwardly from the outer periphery of split disk 48, almost to the lower outer periphery of this disk, as viewed in FIG. 6. Central region or tongue 51 is therefore free to flex relative to the remainder of the body of disk 48. Slots 64 additionally provide for the passage of fittings 65 (FIG. 5) which are fixed to intermediate disk 55, and are adapted to support a battery (not shown) which is automatically activated by sea water, so as to power the electrical equipment carried by the jettisoning and flotation apparatus.

The described device operates generally as follows. At the time of jettisoning, the members of the releasable fastening device are in the relative positions shown in FIG. 5. When the parachute opens, the force exerted by sling 39 (see FIG. 4) on connector 47 causes a slight upper movement of connector 47 relative to cover 45, this slight movement being permitted by the elasticity of central region or tongue 51 of split disk 48. This upward shifting of connector 47 lifts spring 57 slightly, such that its bent end moves out of groove 61, and flexes outwardly to align itself with orifice 62 in cover 45. The remaining members of the device are maintained in their initial positions during the continued descent of the apparatus, and hence, apart from the bent end of spring 57, the various members remain substantially as shown in FIG. 5 until the load 40 contacts the water. The upward force on connector 47 during descent is greater than the force of spring 57, and hence the connector 47 remains in an upper position, which in turn retains tongue 51 in its upper position, such that stops 52 remain in their upper positions where they retain split ring 53 in an expanded state and engaged in peripheral groove 44.

When load 40 hits the water, the tension on sling 39 is reduced abruptly, and spring 57 urges connector 47 downwardly, connector 47 in turn acting on central region or tongue 51 of split disk 48 in order to flex the tongue downwardly and move stops 52 downwardly to free the ends of split ring 53. The free end of spring 57 is, of course, received in orifice 62 of cover 45.

When its opposed ends are freed by the downward movement of stop 52, split ring 53 contracts radially, and thus moves out of groove 44, such that cover 45 and its connected components are no longer secured to envelope 43. The load thus is now free of sling 39 and can descend to a predetermined depth, whereat to be suspended by a cable (not shown) connecting it to the float formed by ballonet 31. An elastic link can be incorporated in this cable in order to compensate for the swell effects of the ocean on the load 40.

The box 36 containing the transmitter is secured in ballonet 31 as shown in FIG. 7. Its tubular portion 35 is secured in orifice 34 formed in the lower wall of ballonet 31 by means of prolongations of suspension lines 37 set in a groove 66 formed at the lower end of tubular portion 35. These suspension lines run generally as shown in FIG. 8. They cross at the center of the parachute in such a manner that it is a simple and easy matter to wind some or all of them around the tubular portion 35 of box 36, which serves to increase the mechanical strength of the parachute assembly.

Tubular portion 35 is formed with lateral orifices 67, allowing ballonet 31 to auto-inflate during descent. A plug 68 is provided to close off box 36, and this plug preferably is adapted to be penetrated by a conductor cable (not shown) connecting the equipment in envelope 43 to the transmitter housed in box 36. Box 36 is closed by cover 69, provided with a coaxial connector which is connected to antenna 32 by a coaxial cable 71. An elastic link 72 links cover 69 to the center of the upper wall of the ballonet.

It will be appreciated that because of its different releasable fastening arrangement, the embodiment of FIGS. 4–8 requires only one sling 39 to link the load to the parachute.

In both embodiments, there is no need for a releasing paddle located beneath the load to effect the releasing operation upon entry into the water. The theory of operation of such releasing paddles assumes that the load presents itself vertically at touchdown, which frequently is not the case, and hence the instant invention, as to both embodiments, eliminates the risk of defective operation in case of adverse wind effects during descent. Avoidance of the use of a releasing paddle also provides additional space in the load envelope, which otherwise would have to contain a gearing mechanism or the like between the releasing paddle and the hooking apparatus between the load and the parachute. Avoidance of the use of a releasing paddle also permits the use of a better shock-proof shape to the load by equipping the load with a ballast which has a streamlined shape, as at 42. This permits an increased speed of descent, and consequently a decrease of parachute surface.

The arrangement whereby the box containing the transmitter is secured to the lower wall of ballonet 31, as in FIG. 7, avoids deflation and bursting risks when the device enters the water.

It will be readily apparent to persons skilled in the art that the illustrated embodiment is exemplary of a preferred embodiment of the invention, and is not limiting of the invention. Various modifications of the illustrated embodiment will be apparent to persons skilled in the art, without departing from the spirit and scope of the invention.

We claim:

1. Apparatus for use in the jettisoning and flotation of a suspended load, particularly an underwater listening device, comprising a parachute for suspending the load during descent between jettisoning and flotation, and at least one inflatable float for maintaining the load at a predetermined depth in a body of water, said float comprising an inflatable ballonet fixed in the central portion of said parachute, an inflation sleeve coupled at one end to said ballonet and open for influx of air at its free other end for inflating said ballonet with superatmospheric air pressure generated by the descent of said parachute, and a tension member fixed at one end to said free end of said sleeve and adapted for coupling of its other end to the load so as to extend said sleeve downwardly during descent with its free end facing downwardly, wherein said parachute is cruciform and said ballonet comprises two generally square pieces of fabric which are secured edge-to-edge such that the ballonet viewed in plan is of generally square shape, one of the pieces of fabric which forms said float being coupled with said inflation sleeve and constituting the central portion of the parachute and the lower surface of said ballonet, the branches of which parachute are formed by rectangles of sheet-like material which are secured to the lower piece of said ballonet at one of their smaller sides, and suspension lines extending from said parachute and connected to a connecting member adapted for connection to the load.

2. Apparatus as claimed in claim 1, wherein the securements between the said lower fabric square and the rectangles of said parachute are covered by waterproof strips adhesively secured along said securements.

3. Apparatus according to claim 1, comprising a sling for fixing the load to the parachute, one end of said sling being fixed to said connecting member of said suspension lines, the other end of said sling being connected to a coupling device comprising a rocking fastener, said tension member for extending said sleeve comprising a link, said other end of said link opposite said sleeve being also fixed to said rocking fastener, and a resilient link extending between and connected to said fastener and the load.

4. Apparatus according to claim 3 wherein said rocking fastener has a rectilinear side and a recess, in which recess there is engaged a hook for the suspension of the load during descent, said sling being fixed to that end of the rectilinear side of the fastener which is closer to said recess, and said tension member being fixed to the other end of the said rectilinear side, such that said tension member exerts an upward pivotal force on said rocking fastener to release said hook from said recess when the apparatus enters the water.

5. Apparatus according to claim 1 wherein the upper fabric piece of said ballonet, opposite to that bearing said sleeve, supports a whip antenna, said whip antenna having a foot end secured to a rigid disk which is in turn secured to said upper fabric rectangular piece and forms the lid of a box containing radio transmission equipment for an underwater listening buoy.

6. Apparatus according to claim 5 wherein a resilient member for maintaining the antenna in position connects the two fabric pieces constituting said ballonet, and opposes separation thereof beyond a predetermined separation.

7. Apparatus as claimed in claim 1 wherein said ballonet, when inflated, is of less vertical extent than lateral horizontal extent so as to minimize wind loads thereon.

8. Apparatus for use in the jettisoning and flotation of a suspended load, particularly an underwater listening device, comprising a parachute for suspending the load during descent between jettisoning and flotation, an auto-inflatable float carried by the parachute for maintaining the load at a predetermined depth in a body of water, a load container comprising a tubular envelope, sling means and a releasable fastening for coupling the load to the parachute, the releasable fastening comprising a cover for the upper end of said tubular envelope, a connector carried by the cover and coupled to said sling, a peripheral groove formed in the wall of said envelope, a resilient split ring retainer partially housed in said groove and bearing against said cover to retain said cover in position in said envelope, said ring being of unstressed diameter less than the diameter of said peripheral groove so as to move out of said groove unless forceably retained therein, stop means carried by said cover for retaining said split ring in said groove during descent, and spring means for moving said stop means out of their retaining positions in response to reduced tension on said sling when said envelope enters the water.

9. Apparatus as claimed in claim 8 wherein said connector is movable in said cover and coupled with said stop means such that tension on said sling acts on said connector to urge said stop means into their retaining positions, and said spring means acts on said connector to urge said stop means out of their retaining positions.

10. Apparatus as claimed in claim 9 wherein said spring means has a normally free end forceably engageable in a notch carried by said cover such that, when so engaged, said spring means is prevented from urging said stop means out of their retaining positions, said spring means being so configured at said free end as to be releasable from said notch in response to upward force on said connector during opening of said parachute in the initial stage of descent, whereafter to urge said stop means out of said retaining positions, in opposition to but overcome by the upward force on said connector during subsequent descent and before entry of the envelope into the water.

11. Apparatus as claimed in claim 10 wherein said stop means and said connector are coupled to a resilient member carried by said cover.

12. Apparatus according to claim 11 wherein said cover includes an orifice for freely receiving the free end of said spring means after its release from said notch.

13. Apparatus for use in the jettisoning and flotation of a suspended load, particularly an underwater listening device, comprising a parachute for suspending the load during descent between jettisoning and flotation, an auto-inflatable float carried by the parachute for maintaining the load at a predetermined depth in a body of water, sling means for coupling the load to the parachute through a releasable fastening, said float comprising a ballonet supporting an external whip antenna extending from its upper wall, the lower wall of said ballonet having a central orifice formed therein for auto-inflation of the ballonet during descent, a box within said ballonet carrying a radio transmitter connected to said antenna by a coaxial cable, said box comprising a tubular portion passing from said orifice into the interior of said ballonet, and having air holes formed therein for passing air from the exterior through the orifice and into the interior of the ballonet.

14. Apparatus as claimed in claim 13 wherein said parachute includes suspension lines, said suspension lines being secured along the main body portion of the parachute and wrapped around a peripheral groove formed in said tubular portion beneath said orifice so as to secure said tubular part firmly to said parachute and said ballonet, and an elastic link for linking the center of the upper wall of the ballonet to said box within the ballonet.

* * * * *